US011251638B2

(12) United States Patent
Chiu et al.

(10) Patent No.: US 11,251,638 B2
(45) Date of Patent: Feb. 15, 2022

(54) METHOD AND DEVICE FOR CHARGING ALUMINUM BATTERY

(71) Applicant: Industrial Technology Research Institute, Hsinchu (TW)

(72) Inventors: Sheng-Cheng Chiu, Taoyuan (TW); Chien-Chih Chiang, New Taipei (TW); Ping-I Pan, Tainan (TW); Chang-Chung Yang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 318 days.

(21) Appl. No.: 16/436,398

(22) Filed: Jun. 10, 2019

(65) Prior Publication Data
US 2020/0203956 A1 Jun. 25, 2020

(30) Foreign Application Priority Data
Dec. 19, 2018 (TW) .................................. 107145813

(51) Int. Cl.
*H02J 7/04* (2006.01)
*H02J 7/00* (2006.01)
(Continued)

(52) U.S. Cl.
CPC ............. *H02J 7/007* (2013.01); *H01M 4/587* (2013.01); *H01M 10/054* (2013.01); *H01M 10/44* (2013.01)

(58) Field of Classification Search
None
See application file for complete search history.

(56) References Cited

U.S. PATENT DOCUMENTS 9,694,699 B2 7/2017 Kelty et al.
9,843,070 B2 12/2017 Dai et al.
(Continued)

FOREIGN PATENT DOCUMENTS

TW 200302618 A 8/2003
TW 583038 B 4/2004
(Continued)

OTHER PUBLICATIONS

Das et al., "Aluminium-ion batteries: developments and challenges.", Journal of Materials Chemistry A, vol. 5, 6347-6367, (2017).
(Continued)

*Primary Examiner* — Arun C Williams
(74) *Attorney, Agent, or Firm* — Birch, Stewart, Kolasch & Birch, LLP

(57) ABSTRACT

A method for charging aluminum batteries includes performing a first charging procedure for the aluminum battery until the voltage of the aluminum battery reaches a set value. The first charging procedure at least includes a first constant-current charging using a first constant current to charge an aluminum battery in a first stage. The range of the first constant current is from 5 C to 100 C, and C (C-rate) refers to a unit of the capacity of the aluminum battery. When the voltage of the aluminum battery reaches the set value, a first constant-voltage charging uses a first constant voltage to charge the aluminum battery. According to the charging current provided by the first constant voltage to the aluminum battery or the charge time for the aluminum battery charged by the first constant voltage, a determination is made to stop the charging process on the aluminum battery.

11 Claims, 8 Drawing Sheets

(51) Int. Cl.
  *H01M 4/587* (2010.01)
  *H01M 10/44* (2006.01)
  *H01M 10/054* (2010.01)

(56) References Cited

U.S. PATENT DOCUMENTS

| | | | | |
|---|---|---|---|---|
| 2010/0291438 | A1* | 11/2010 | Ahn | H01M 4/137 |
| | | | | 429/212 |
| 2011/0018500 | A1* | 1/2011 | Takahashi | H02J 7/00 |
| | | | | 320/148 |
| 2012/0086406 | A1 | 4/2012 | Maeagawa | |
| 2013/0154578 | A1 | 6/2013 | Kawai et al. | |
| 2013/0314050 | A1* | 11/2013 | Matsubara | H02J 7/00 |
| | | | | 320/134 |
| 2015/0077058 | A1* | 3/2015 | Jung | H01M 10/44 |
| | | | | 320/112 |
| 2019/0074704 | A1* | 3/2019 | Krasovitsky | H01M 4/0445 |

FOREIGN PATENT DOCUMENTS

| | | | |
|---|---|---|---|
| TW | 587359 B | 5/2004 | |
| TW | 201125182 A | 7/2011 | |
| TW | 201131931 A | 9/2011 | |
| TW | I470901 B | 1/2015 | |
| TW | 201543733 A | 11/2015 | |
| TW | 1606630 B | 11/2017 | |
| TW | I613853 B | 2/2018 | |

OTHER PUBLICATIONS

Elia et al., "Insights into the reversibility of aluminum graphite batteries.", Journal of Materials Chemistry A, vol. 5, 9682-9690, (2017).
Jiao et al., "A rechargeable Al-ion battery: Al/molten AlCl3-urea/graphite"., ChemComm, vol. 55, 2331-2334, (2017).
Kravchyk et al., "Efficient Aluminum Chloride-Natural Graphite Battery"., CMMATERIALS, vol. 29, 4484-4492, (2017).
Mauney, "The control strategy of the charger"., Oct. 20, 2009.
Office Action issued in Taiwanese Patent Application No. 107145813 dated May 23, 2019.
Wang et al., "Advanced rechargeable aluminium ion battery with a high-quality natural graphite cathode"., nature.com, 7 pages, vol. 8, 2017.
Wang et al., "Kish Graphite Flakes as a Cathode Material for an aluminum Chloride-Graphite Battery"., ACS Applied Materials & Interfaces, 9, 28478-28485, (2017).

* cited by examiner

METHOD AND DEVICE FOR CHARGING ALUMINUM BATTERY

CROSS REFERENCE TO RELATED APPLICATIONS

This application claims priority of Taiwan Patent Application No. 107145813, filed on Dec. 19, 2018, the entirety of which is incorporated by reference herein.

TECHNICAL FIELD

The present disclosure relates to a method and a device for charging an aluminum battery and, in particular, to a method and device for charging an aluminum battery having a graphitic-powder electrode.

BACKGROUND

With the development of electric vehicles, the research on secondary batteries has become more and more important. The requirements on secondary batteries in the market for electric vehicles not only involve energy conservation and carbon reduction but that they can be fully charged in a short time. As a result, how to effectively charge a secondary battery quickly has become an important issue today. Currently, conventional secondary batteries include lead-acid batteries, Nickel-cadmium batteries, NiMH batteries, Nickel-zinc batteries, lithium batteries, Carbon-zinc batteries, and so on.

Due to the limitations of the physical or chemical properties of conventional secondary batteries, conventional secondary batteries are currently capable of receiving charging currents ranging from about 0.1 C to about 1 C. If users attempt to charge these conventional secondary batteries with a larger current (over 1 C), it may damage these conventional secondary batteries. Then, the batteries may fail due to excessive chemical reactions caused by the large charging current in the battery. Additionally, the large charging current hardly increases the capacity of the secondary batteries yet it can easily reduce the life cycle of the secondary batteries. Therefore, users often face situations wherein the secondary batteries cannot become fully charged. Because of the limitations of the chemical and physical characteristics of conventional secondary batteries, it is difficult to increase the charging current very much, and charge time is hardly reduced. As a result, in order to solve problems wherein the conventional secondary battery cannot be quickly charged and the battery cannot be fully charged, the present disclosure proposes a method and device for charging aluminum batteries.

SUMMARY

The present disclosure proposes a method and device for charging aluminum batteries in order to increase the capacity of the aluminum batteries and greatly reduce the charge time.

According to one exemplary embodiment of the disclosure, an aluminum battery charging method includes the following steps, shown below. Operate a first charging procedure to the aluminum battery until the voltage of the aluminum battery reaches a set value. The first charging procedure at least includes operating a first constant-current charging in a first stage to the aluminum battery by using a first constant current, and the first constant current is 5 C~100 C, wherein C (C-rate) represents the unit of the capacity of the aluminum battery. When the voltage of the aluminum battery reaches the set value, a first constant-voltage charging is operated to charge the aluminum battery by using a first constant voltage. According to the charging current or charge time which are caused by the first constant voltage charging the aluminum battery, a determination is made to stop charging the aluminum battery.

According to another exemplary embodiment of the disclosure, an aluminum battery charging device includes a charger and a controller. The charger is coupled to the aluminum battery. The controller includes a set value and compares the voltage of the aluminum battery to the set value. The controller controls the charger to operate a first charging procedure in accordance with the comparison result. When the charger operates the first charging procedure, the charger at least operates a first constant-current charging in a first stage to charge the aluminum battery by using a first constant current. The first constant current is 5 C~100 C, wherein C (C-rate) represents the unit of the capacity of the aluminum battery. When the controller detects that the voltage of the aluminum battery reaches the set value, the controller controls the charger to operate a first constant-voltage charging to the aluminum battery by using a first constant voltage. The controller determines that the charger should stop charging the aluminum battery based on the charging current or the charge time, which are caused by the first constant voltage charging the aluminum battery.

DETAILED DESCRIPTION

Figure 1:
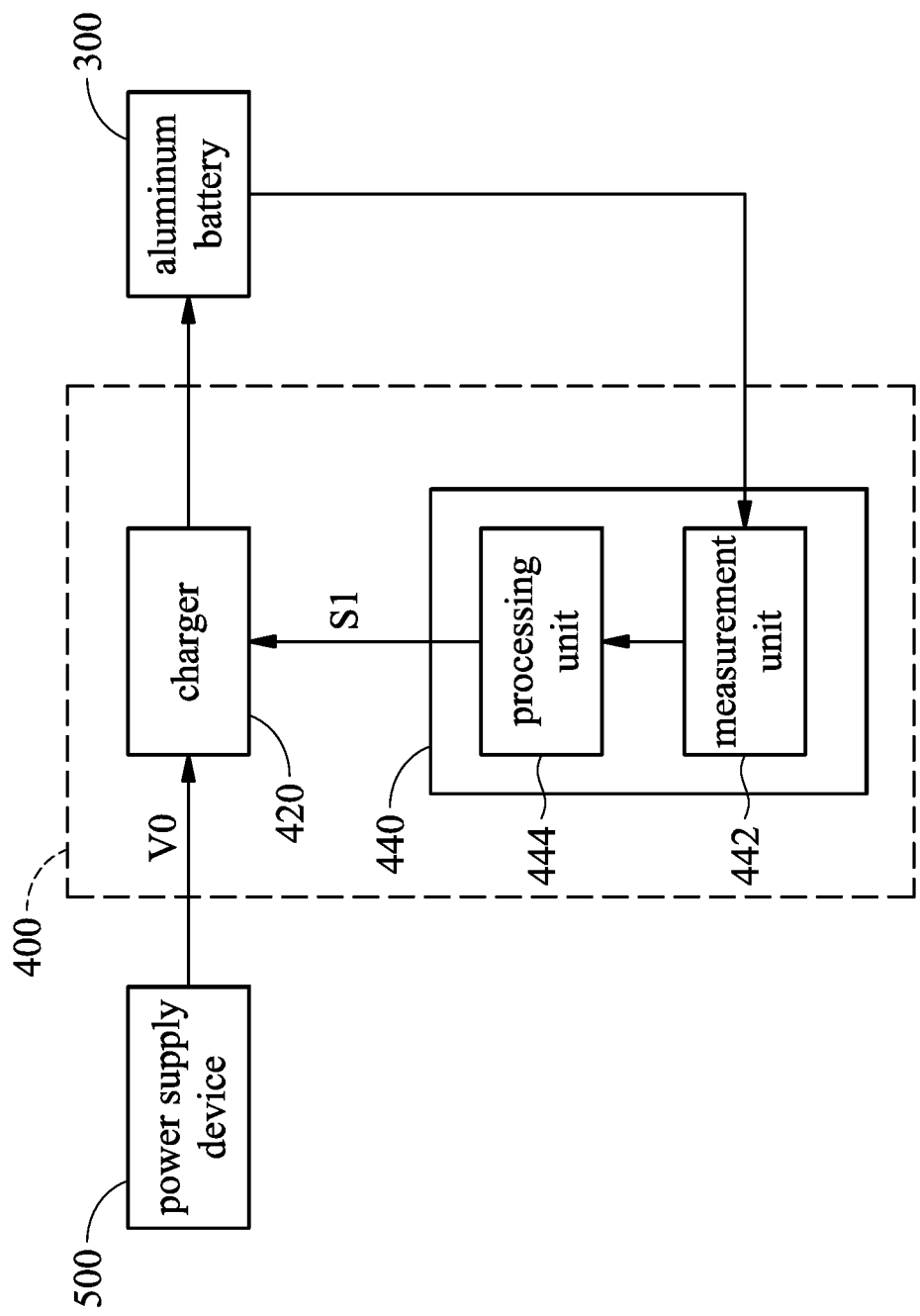
FIG. 1 is a block diagram of the aluminum battery charging device, in accordance with one embodiment of the present disclosure.

The present disclosure is described with reference to the attached figures, where like reference numerals are used throughout the figures to designate similar or equivalent elements. The figures are not drawn to scale and are provided merely to illustrate the instant disclosure. Several aspects of the disclosure are described below with reference to example applications for illustration. It should be understood that numerous specific details, relationships, and methods are set forth to provide a full understanding of the disclosure. One having ordinary skill in the relevant art, however, will readily recognize that the disclosure can be practiced without one or more of the specific details, or with other methods. In other instances, well-known structures or operations are not shown in detail to avoid obscuring the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

The following description is an embodiment of the present disclosure. The purpose of the present disclosure is to exemplify the general principles of the disclosure and should not be construed as limiting the scope of the disclosure, which is defined by the scope of the claims.

Because the conventional secondary batteries cannot be charged with larger current, it is difficult to effectively reduce the charge time of the secondary battery. As a result, the present disclosure makes use of the aluminum battery's advantages, including high security, low cost, fast charge/discharge, long life cycle and so on, to overcome the deficiencies of the conventional secondary batteries as mentioned above. Using conventional techniques, users mostly use a large current to charge an aluminum battery having a 3D graphitic-foam electrode, and this will not impact the capacity and life cycle of the aluminum battery under a fast charge or discharge. However, the 3D graphitic-foam electrode has the following deficiencies: as large volume, overweight, low energy density and difficult to mass produce. As a result, the present disclosure specifically proposes a method and device for charging an aluminum battery having a graphitic-powder electrode so that the aluminum battery can be charged in a short time and can have a higher capacity.

FIG. 1 is a block diagram of the aluminum battery charging device 400, in accordance with one embodiment of the present disclosure. As shown in FIG. 1, the aluminum battery charging device 400 (or charging device 400) includes a charger 420 and a controller 440. The charger 420 is coupled to the aluminum battery 300 and configured to receive the power V0 from the power supply device 500. The power V0 provided by the power supply device 500 can be direct current or alternating current. The charger 420 at least has a power conversion circuit (not pictured), and the power conversion circuit can be a DC-DC converter, a AC-DC converter, a LLC converter, a fly-back converter and so on. However, the present disclosure is not limited to this. In addition, because the charger 420 can include a plurality of power conversion circuits, the charger 420 can convert the power V0 to different direct power by using the different power conversion circuits, such as the first constant current, the second constant current, the third constant current, the first constant voltage or the second constant voltage, and selectively provide the different direct power mentioned above to the aluminum battery 300.

The controller 440 in the aluminum battery charging device 400 includes a measurement unit 442 and a processing unit 444. The measurement unit can be also implemented as a sensing device placed outside the controller 440. The processing unit 444 further includes a set value. The measurement unit 442 in the controller 440 can detect the voltage of the aluminum battery 300 and deliver the measured voltage to the processing unit 444. The processing unit 444 compares the voltage of the aluminum battery 300 with the set value, and the processing unit 444 outputs the control signal S1 to control the charger 420 to operate a first charging procedure based on the comparison result. In the present disclosure, when the charger 420 performs the first charging procedure, according to the control signal S1, the charger 420 selectively provides one of the first constant current, the second current, the third constant current or the second constant voltage to charge the aluminum battery 300. When the charger 420 completes the first charging procedure, the charger 420 changes to provide the first constant voltage to charge the aluminum battery. Consequently, in the first charging procedure, the charger 420 won't provide the first constant voltage to charge the aluminum battery 300. The descriptions above are only used to illustrate the examples in the present disclosure, but the present disclosure is not limited to this.

The measurement unit 442 in the controller 440 can measure the different charging states and parameters of the aluminum battery 300 and output the results of the measurement to the processing unit 444 in the controller 440. The processing unit 444 can be a central processing unit (CPU), micro-processor and so on. A person having ordinary skill in the art can comprehend that the processing unit 444 in the controller 440 can identify the comparison result output by the measurement unit 442 so that the controller can output different control signals S1 to the charger 420. Therefore, the present application does not repeatedly illustrate and draw the operation principles of the controller 440. The measurement unit 442 in the controller 440 measures the aluminum battery 300 and output the measured parameters which includes the voltage of the aluminum battery 300, charging current and so on. The measurement unit 442 in the controller 440 also measures the predetermined time for charging, the charge time of the first stage, the charge time of the second stage, and the charge time of the third stage, but the present disclosure is not limited to this.

Figure 2A:
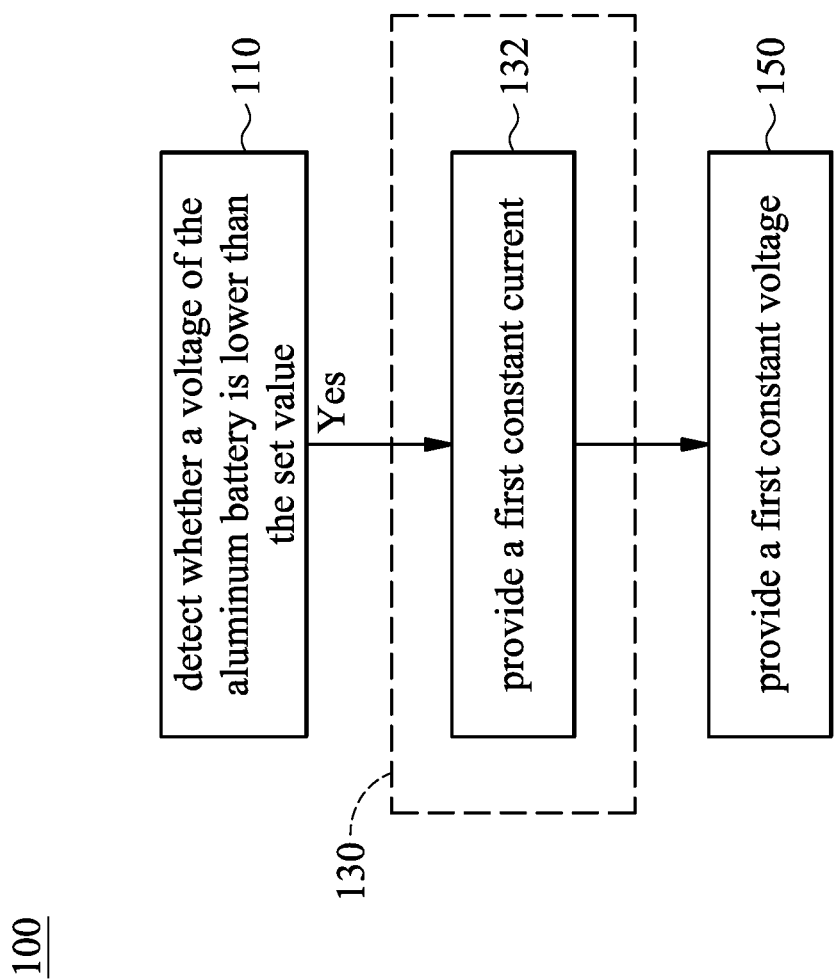
FIG. 2a is a flow chart of the charging method of the aluminum battery, in accordance with one embodiment of the present disclosure.
Figure 2B:
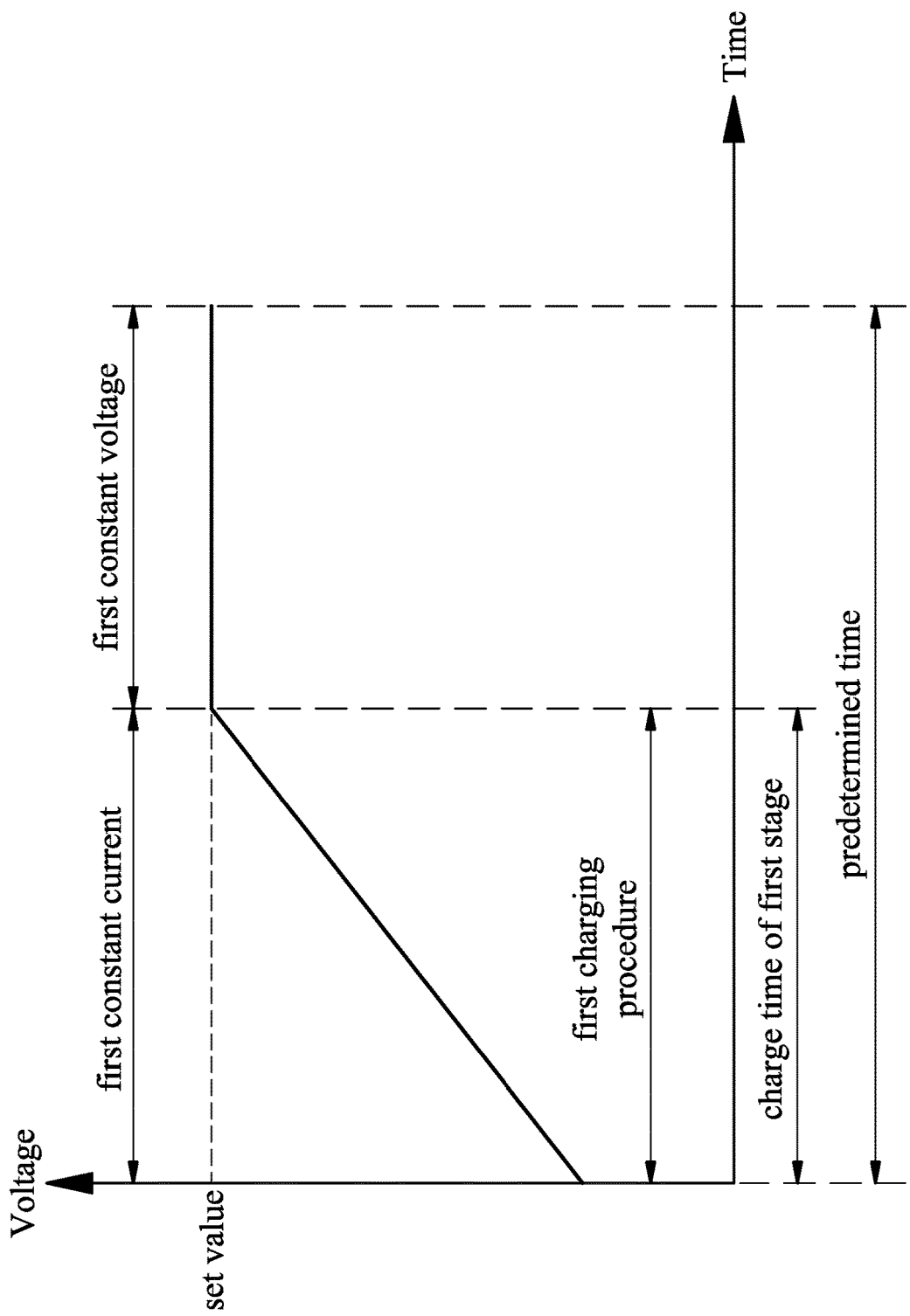
FIG. 2b depicts a schematic diagram of the aluminum battery's voltage when the aluminum battery charging device charges the aluminum battery, in accordance with one embodiment of the present disclosure.

FIG. 2a is a flow chart of the charging method 100 of the aluminum battery, in accordance with one embodiment of the present disclosure. Compare to FIG. 1, FIG. 2a depicts the procedure of the aluminum battery charging device 400 charging the aluminum battery 300 in this example. Simultaneously, FIG. 2b depicts a schematic diagram of the aluminum battery's voltage when the aluminum battery charging device 400 charges the aluminum battery 300, in accordance with one embodiment of the present disclosure. Please refer to the FIG. 1, FIG. 2a and FIG. 2b for illustrating the present example below. In this example, the charger 420 can include a constant current source, a constant voltage source, or a power switching between the constant current and the constant voltage. The charger 420 determines to output the constant current or the constant voltage based on the controls of the controller 440.

As shown in FIG. 2a and FIG. 2b, in step 110, when the controller 440 detects that the voltage of the aluminum battery 300 is lower than a set value, the controller 440 controls the charger 420 to perform step 130 and start the first charging procedure. In the first charging procedure, the charger 420 operates a first constant-current charging in a first stage 132 to the aluminum battery 300 by using the first constant current. The controller starts to detect the charge time. When the controller 440 identifies that the voltage of the aluminum battery has reached the set value, the first charging procedure is finished. The range of the first constant current is 5 C~100 C (C-rate). The charge time of the first stage is measured from the beginning of charging the aluminum battery 300 to the time at which the voltage of the aluminum battery reaches the set value. According to the value of the first constant current, the charge time of the first stage can be in the range from 6 seconds to 15 minutes.

C (C-rate) recited in the present disclosure represents the unit of the capacity of the aluminum battery. In general, ampere (or milliampere) represents the unit of the charging current (or discharging current) of batteries; in addition, a person having ordinary skill in the art can comprehend that C (C-rate) can be taken as the current portion of the rated capacity (Current multiplied by Time), so C (C-rate) can be used to assess current. C (C-rate) is inversely proportional to Time; therefore, when the value of C (C-rate) becomes larger, it means that the charging/discharging current of the battery becomes larger, and the charge/discharge time of the battery becomes shorter. On the contrary, when the value of C (C-rate) becomes smaller, it means that the charging/discharging current of the battery becomes smaller, and the charge/discharge time of the battery becomes longer. For example, 1 C represents that the all of the electric capacity in a battery is fully charged or discharged in one hour. 2 C represents that the all of the electric capacity in the battery is fully charged or discharged in half an hour (30 minutes). 10 C represents that the all of the electric capacity in the battery is fully charged or discharged in 0.1 hour(s) (6 minutes). 0.5 C represents that the all of the electric capacity in the battery is fully charged or discharged in two hours (120 minutes). For example, if the capacity of the aluminum battery is 10000 mAh, 1 C represents the value of current is 10000 mA, and 2 C represents the value of current is 20000 mA. As a result, C (C-rate) represents the value of charging or discharging current in the present disclosure for facilitating to illustrate the operations and principles of the present disclosure, but the present disclosure is not limited to this.

In FIG. 2a, when the controller 440 detects that the voltage of the aluminum battery 300 reaches the set value, the controller 440 controls the charger 420 to finish the charging in the first stage 132 and the first charging procedure, and the controller 440 operates step 150. In step 150, the controller 440 controls the charger to output a first constant voltage to the aluminum battery 300. At this time, the controller 440 continuously detects whether the charge time of the aluminum battery charging device 400 that keeps charging the aluminum battery 300 has reached the predetermined time. If the controller 440 detects that the charge time has reached the predetermined time, the controller 440 stops the charger 420, which operates the first constant-voltage charging. The term "predetermined time" refers to the overall charge time of the charger 420 that keeps charging the aluminum battery 300. The overall charge time of the charger 420 includes the charge time of the first charging procedure and the first constant-voltage charging. The value of the first constant voltage is identical to the set value, but the present disclosure is not limited to this.

In some other embodiments, if the controller 440 detects that the charging current output by the charger 420 is lower than or equal to a setting output charging current, the controller 440 controls the charger 420 to stop the first constant-voltage charging. The setting output charging current may be 0.1 C~0.7 C or 0.3 C~0.5 C, for example, and may be adjusted to meet demand. As a result, the aluminum battery 300 may be prevented from being overcharged by the charger 420.

Figure 3A:
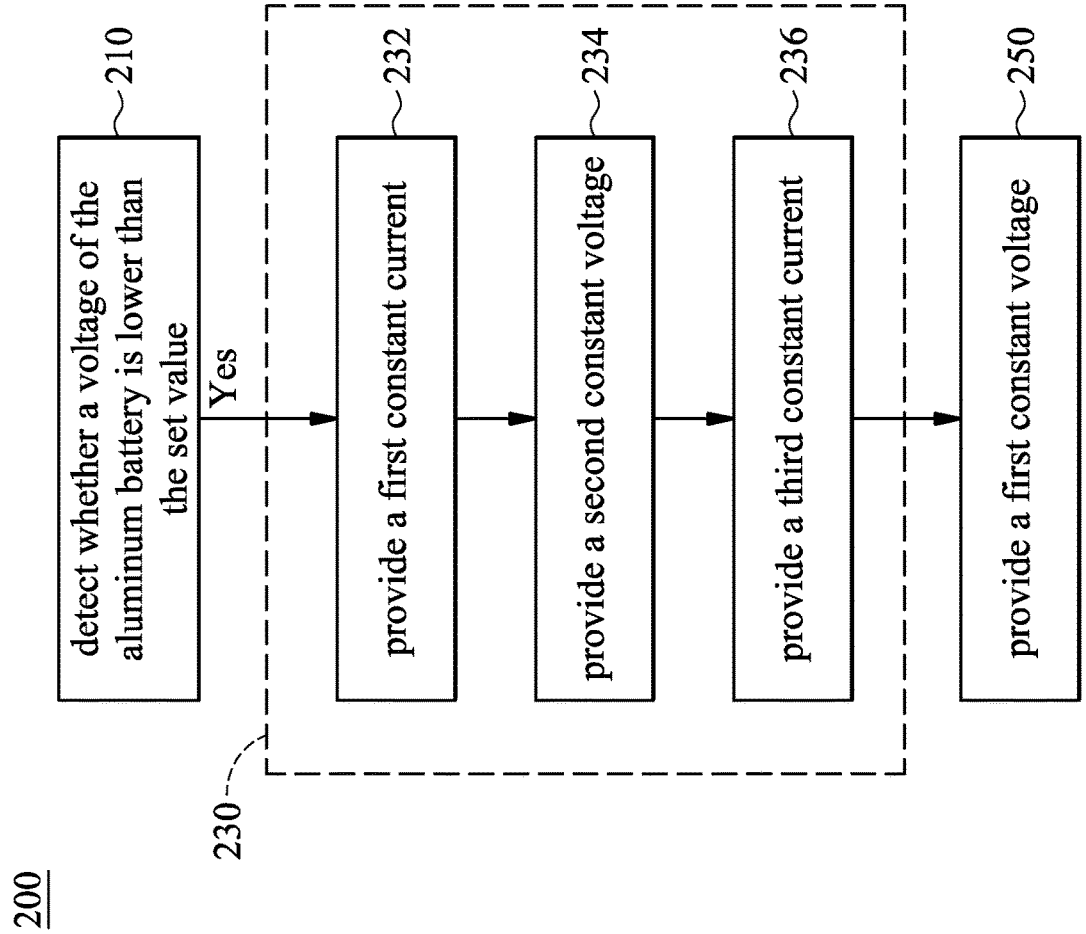
FIG. 3a is a flow chart of the charging method of the aluminum battery, in accordance with another embodiment of the present disclosure.
Figure 3B:
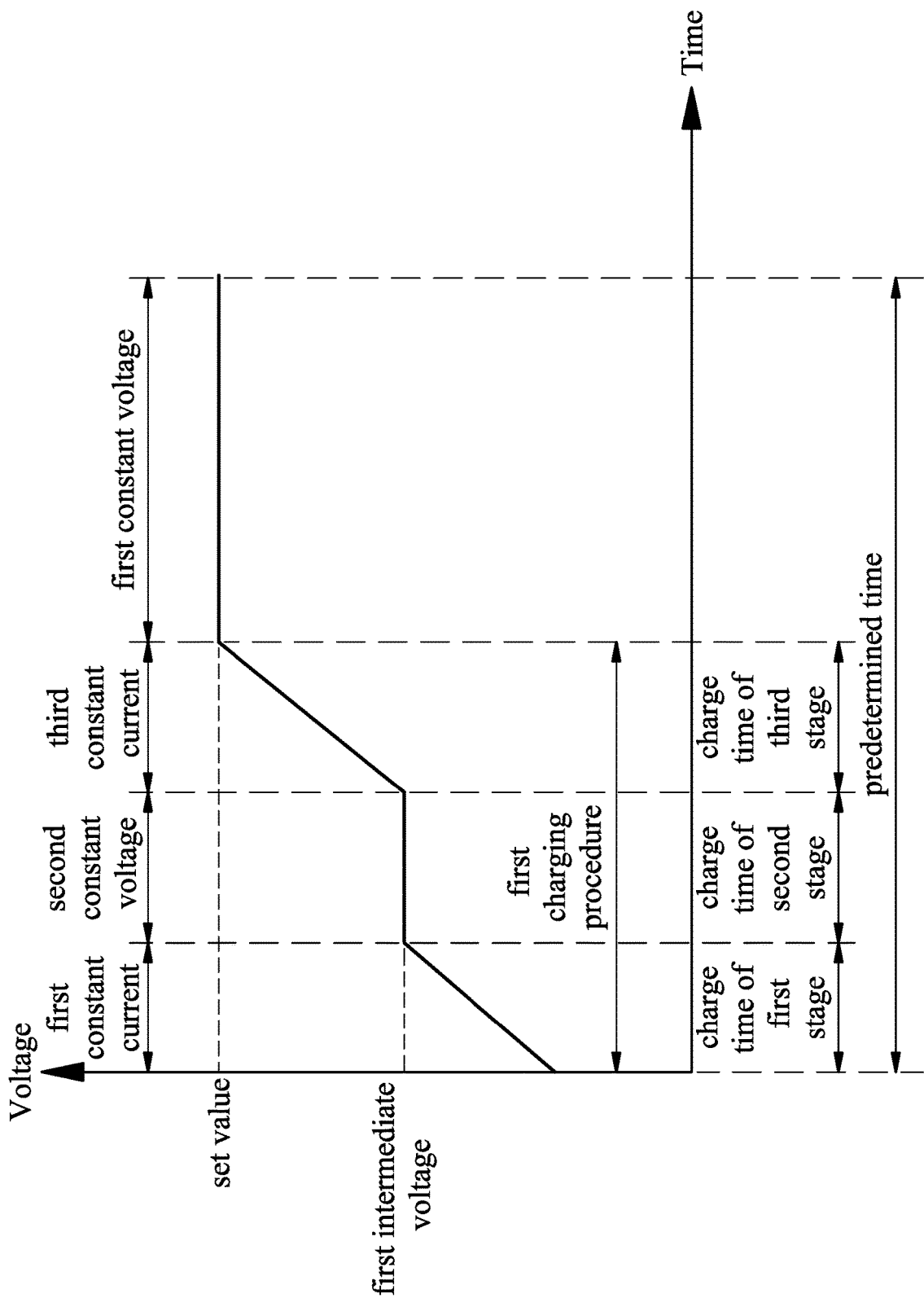
FIG. 3b depicts a schematic diagram of the aluminum battery's voltage when the aluminum battery charging device charges the aluminum battery, in accordance with another embodiment of the present disclosure.

FIG. 3a is a flow chart of the charging method 200 of the aluminum battery 300, in accordance with other embodiment of the present disclosure. Compare to FIG. 1, FIG. 3a depicts the procedure of the aluminum battery charging device 400 charging the aluminum battery 300 in this example. Simultaneously, FIG. 3b depicts a schematic diagram of the aluminum battery's voltage when the aluminum battery charging device 400 charges the aluminum battery 300, in accordance with another embodiment of the present disclosure. Please refer to the FIG. 1, FIG. 3a and FIG. 3b for illustrating the present example below. In this example, the charger 420 can include a constant current, a constant voltage, or a power switching between the constant current and the constant voltage. The charger 420 determines to output the constant current or the constant voltage based on the controls of the controller 440.

In this embodiment, the first charging procedure indicates that the aluminum battery charge device 400 charges the aluminum battery 300 with three stages. In the aluminum battery charging method 200, the aluminum battery charging device 400 starts to operate step 210. If the controller 440 in the aluminum battery charging device 400 detects that the voltage of the aluminum battery is lower than a set value, the aluminum battery charging device 400 initiates the first charging procedure and enters step 230. In a first stage 232 of the first charging procedure, the charger 420 charges the aluminum battery 300 with the first constant current. When the controller 440 detects that the voltage of the aluminum battery has reached a first intermediate voltage which is lower than the set value, the charge time reaches the charge time of the first stage. As shown in FIG. 3b, because the voltage of the aluminum battery 300 is still lower than the set value, the controller 440 controls the charger 420 to charge the aluminum battery 300 in the second stage 234, and the charger 420 operates a second constant-voltage charging in the second stage 234 to the aluminum battery 300 by using the second constant voltage. Within the charge time of the second stage, because the aluminum battery 300 receives the second constant voltage, the capacity of the aluminum battery 300 is increased. At this point, the value of the second constant voltage is equal to the first intermediate voltage. When the charge time reaches a predetermined charge time of the second stage 234, the controller 440 controls the charger 420 to operate the third stage 236. In the third stage 236, the charger 420 operates a third constant-current charging to charge the aluminum battery 300 by using the third constant current. When the voltage of the aluminum battery 300 reaches the set value, it indicates that the charge time of the third constant current reaches the charge time of the third stage. The controller 440 stops the first charge procedure and controls the charger 420 to operate step 250: providing the first constant voltage to charge the aluminum battery 300. The voltage value of the first constant voltage is equal to the set value, for example.

When the charger 420 outputs the first constant voltage, the controller 440 continuously detects whether the charge time of the aluminum battery charging device 400 charging the aluminum battery 300 reaches the predetermined time. If the controller 440 detects that the charge time reaches the predetermined time, the controller 440 stops the charger from operating the first charging procedure. The predetermined time indicates that the overall charge time of the charger 420 for charging the aluminum battery 300 in the first to third stages. The value of the first constant voltage is identical to the set value, but the present disclosure is not limited to this.

In the present embodiment, if the controller 440 detects that the charging current output by the charger 420 is lower than or equal to 0.1 C, the controller 440 controls the charger 420 to stop the first constant-voltage charging. As a result, the aluminum battery 300 is prevented from being overcharged by the charger 420. In addition, in this embodiment, in the two stages of using the first constant current and the third constant current to charge the aluminum battery 300, at least one of the first constant current and the third constant current meets the requirement for the range of the current value being 5 C~100 C.

Figure 4A:
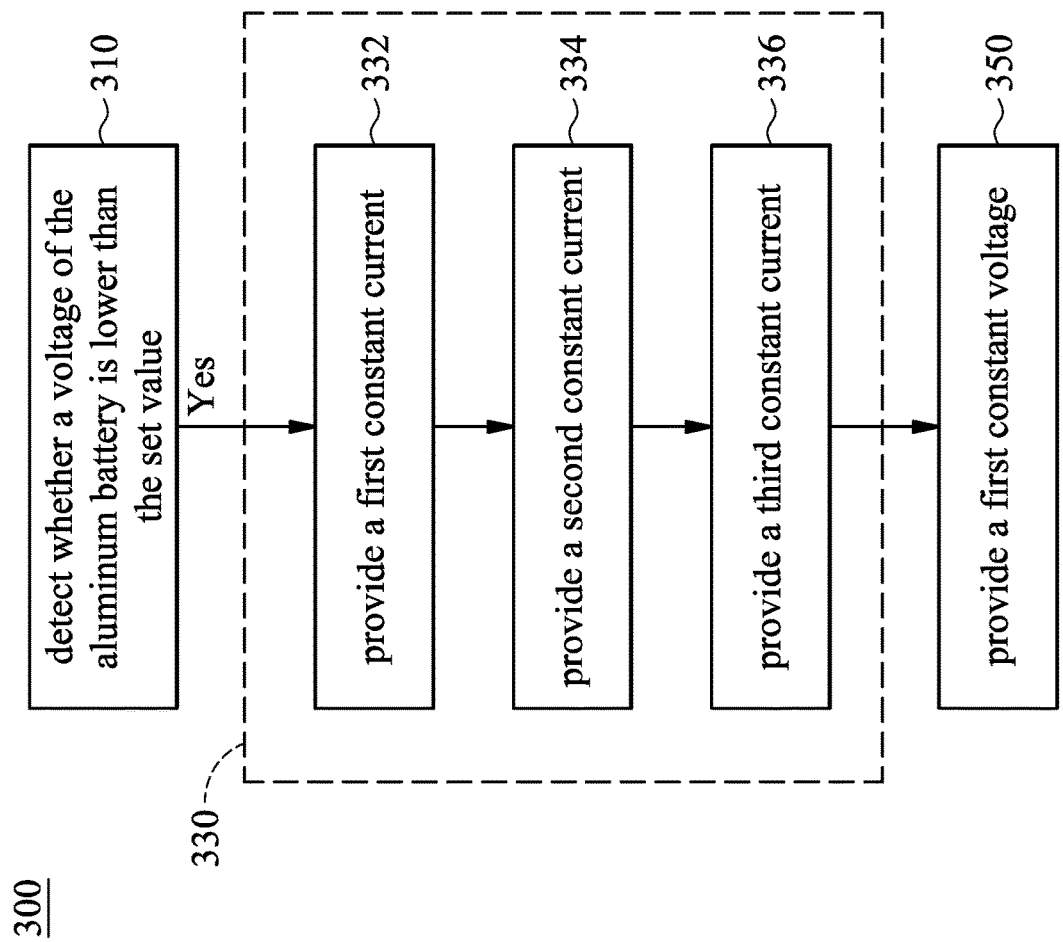
FIG. 4a is a flow chart of the charging method of the aluminum battery, in accordance with another embodiment of the present disclosure.
Figure 4B:
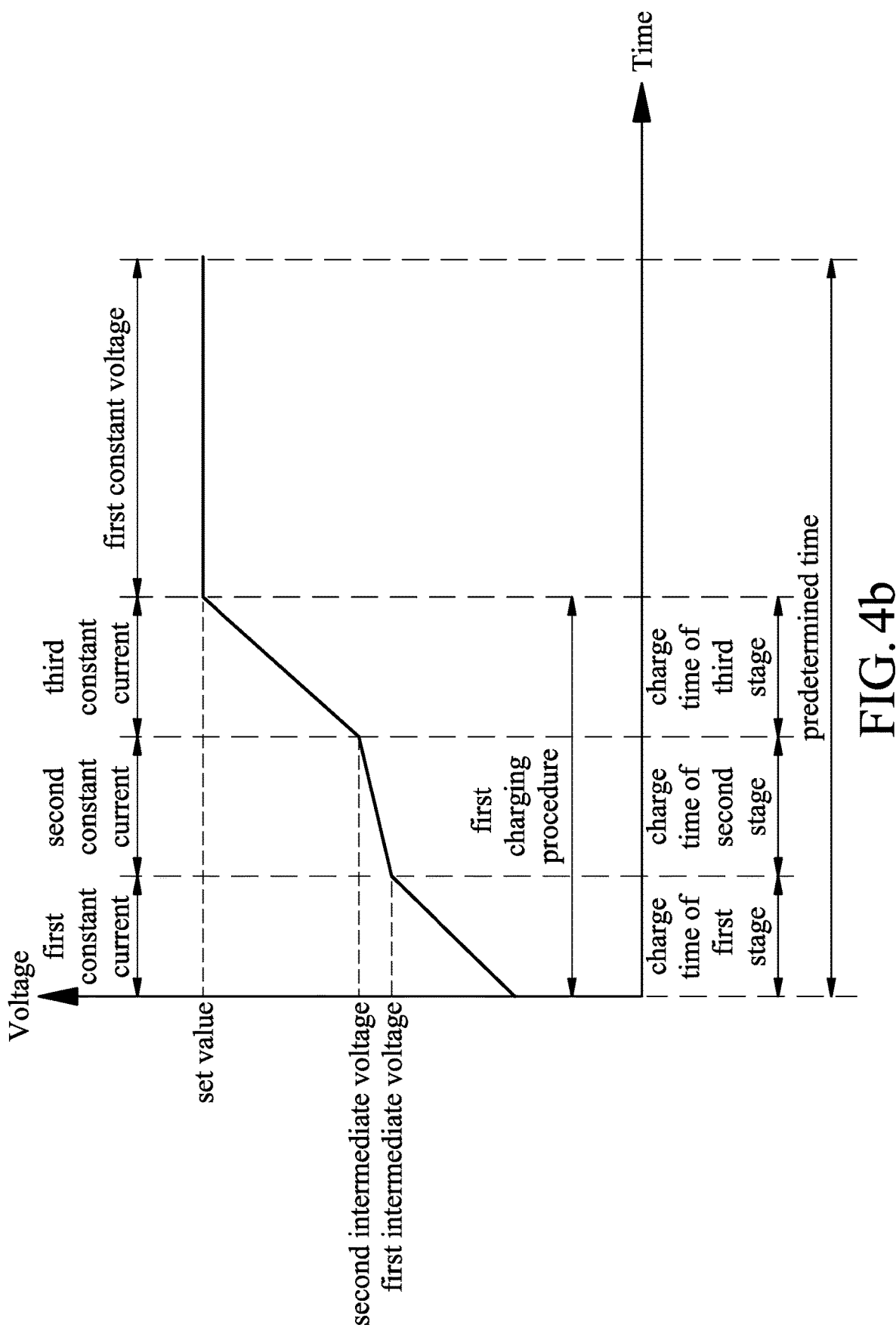
FIG. 4b depicts a schematic diagram of the aluminum battery's voltage when the aluminum battery charging device charges the aluminum battery, in accordance with another embodiment of the present disclosure.

FIG. 4a is a flow chart of the charging method 300 of the aluminum battery 300, in accordance with another embodiment of the present disclosure. Compare to FIG. 1, FIG. 4a depicts the procedure of the aluminum battery charging device 400 charging the aluminum battery in this example. Simultaneously, FIG. 4b depicts a schematic diagram of the aluminum battery's voltage when the aluminum battery charging device 400 charges the aluminum battery 300, in accordance with another embodiment of the present disclosure. Please refer to the FIG. 1, FIG. 4a and FIG. 4b for illustrating the present example below. In this example, the charger 420 can include a constant current source, a constant voltage source, or a power source capable of switching between the constant current mode and the constant voltage mode. The charger 420 determines to output the constant current or the constant voltage based on the controls of the controller 440.

In this embodiment, the first charging procedure charges the aluminum battery with three stages. In the charging method 300 of the aluminum battery, the aluminum battery charging device 400 starts to operate step 310. If the controller 440 in the aluminum battery charging device 400 detects that the voltage of the aluminum battery is lower than a set value, the aluminum battery charging device 400 would initiate the first charging procedure and operate step 330. In the first stage 332 of the first charging procedure, the charger 420 operates a first constant-current charging to charge the aluminum battery 300 by using the first constant current. When the controller 440 detects that the voltage of the aluminum battery reaches a first intermediate voltage which is lower than the set value, it indicates that the charge time reaches the charge time of the first stage. As shown in FIG. 4b, because the voltage of the aluminum battery 300 is still lower than the set value, the controller 440 controls the charger 420 to charge the aluminum battery 300 in the second stage 334, and the charger 420 operates a second constant-current charging in the second stage 334 to the aluminum battery 300 by using the second constant current. When the voltage of the aluminum battery reaches the second intermediate voltage, which is still lower than the set value, it indicates that the charge time reaches the charge time of the second stage. During the charge time of the second constant-current charging (i.e., the charge time of the second stage), because the aluminum battery 300 has received the second constant current, the charge time of the aluminum battery 300 can be shortened and the voltage of the aluminum battery 300 can be boosted to be close but not higher than the set value. In the present disclosure, the value of the second constant current is different from the first constant current and the third constant current. If the value of the second constant current is lower than the first constant current and the third constant current, the aluminum battery 300 has slower voltage increment in the second stage. If the value of the second constant current is higher than the first constant current and the third constant current, the aluminum battery 300 has faster voltage increment in the second stage. Generally, the value of the second constant current is usually smaller than the first constant current and the third constant current.

When the voltage of the aluminum battery 300 reaches the second intermediate voltage or the charge time reaches the charge time of the second stage, the controller 440 controls the charger 420 to execute the third constant-current charging to the aluminum battery 300 by using the third constant current in the third stage 336. When the voltage of the aluminum battery 300 reaches the set value, the charge time of the third constant current reaches the charge time of the third stage. As a result, the controller 440 controls the charger 420 to stop the first charging procedure and output the first constant voltage to charge the aluminum battery 300.

In step 350, when the charger 420 starts to output the first constant voltage, the controller 440 continuously detects whether the charge time reaches the predetermined time or not. If the controller 440 detects that the charge time reaches the predetermined time, the controller 440 would controls the charger 420 to stop the first constant-voltage charging. The predetermined time is overall charge time for the charger 420 to charge the aluminum battery 300. The value of the first constant voltage is identical to the set value, but the present disclosure is not limited to this. Additionally, in this embodiment, at least one of the first constant current and the third constant current has a current value that meets the requirements of 5 C~100 C.

In present embodiment, if the controller 440 detects that the charging current output by the charger 420 is lower than or equal to a setting output charging current, the controller 440 controls the charger 420 to stop the first constant-voltage charging. The setting output charging current may be 0.1 C~0.7 C or 0.3 C~0.5 C, for example, and may be adjusted to meet demand. As a result, the aluminum battery 300 may be prevented from being overcharged by the charger 420.

According to some embodiments of the present disclosure, Table 1 below shows an experiment results, and the experiment results are processed when the aluminum battery charging device 400 charges the aluminum battery 300 at different levels of constant current. Please refer to FIG. 3 to illustrate Table 1.

TABLE 1

|  | Charging method | Capacity(mAh/g) |
|---|---|---|
| Aluminum battery 1 | 1 CC + 120 min CV | 78.6 |
|  | 3 CC + 120 min CV | 38 |
|  | 5 CC + 120 min CV | 121.4 |
|  | 7 CC + 120 min CV | 122.6 |
|  | 10 CC + 120 min CV | 123.9 |
| Aluminum battery 2 | 1 CC + 120 min CV | 64.8 |
|  | 3 CC + 120 min CV | 30.1 |
|  | 5 CC + 120 min CV | 116.2 |
|  | 7 CC + 120 min CV | 117 |
|  | 10 CC + 120 min CV | 117.9 |
| Aluminum battery 3 | 1 CC + 120 min CV | 51.1 |
|  | 3 CC + 120 min CV | 23.9 |
|  | 5 CC + 120 min CV | 104.3 |
|  | 7 CC + 120 min CV | 105.8 |
|  | 10 CC + 120 min CV | 106.3 |

In Table 1, the values of the constant current (CC) provided by the aluminum battery charging device 400 in FIG. 1 are varied in each experiment, but the values of the constant voltage (CV) keep the same. Besides, the charge time of the constant voltage remains the same in each experiment. The aluminum battery charging device 400 charges different aluminum batteries including Aluminum battery 1, Aluminum battery 2 and Aluminum battery 3. Each of the Aluminum batteries 1~3 contains a graphitic-powder electrode. For Aluminum battery 1, the constant-current charging of 1 C and 3 C cannot significantly increase the capacity of the aluminum battery 1 when the Aluminum battery 1 is charged with the same constant voltage for 120 minutes. The constant current with 1 C and the constant voltage with 120 minutes only make the capacity of the Aluminum battery 1 reach 78.6 (mAh/g). The constant current with 3 C and the constant voltage with 120 minutes only make the capacity of the Aluminum battery 1 reach 38 (mAh/g). However, when the charging device 400 provides the constant current with 5 C and the constant voltage with 120 minutes to Aluminum battery 1, the capacity of Aluminum battery 1 can be significantly increased to 121.4 (mAh/g). However, when the charging device 400 further increases the constant current and remains the constant voltage with 120 minutes to charge Aluminum battery 1, the increment of the capacity of Aluminum battery 1 is not obvious. As shown in Table 1, the power of the constant current with 7 C and the constant voltage with 120 minutes can only make the capacity of the aluminum battery 1 to reach 122.6 (mAh/g). The power of the constant current with 10 C and the constant voltage with 120 minutes can only make the capacity of the aluminum battery 1 to reach 123.9 (mAh/g).

In Table 1, for other Aluminum batteries 2~3, when the charging device 400 provides the constant current with 5 C and the constant voltage with 120 minutes to Aluminum batteries 2~3, the capacity of the aluminum batteries 2~3 can be significantly increased. For the aluminum battery having a graphitic-powder electrode, the charging device 400 can increase the capacity of the aluminum battery by providing the constant current with 5 C or more, but it cannot be more effective to increase the capacity of the aluminum battery. As a result, there is a limitation for high constant current charging the aluminum battery, and the high constant current should be matched with the constant-voltage charging to increase the capacity of the aluminum battery.

Specifically, each time of the experiment in this embodiment is operated when the aluminum battery is at the lowest voltage. For example, when the experiment is processed at the first time, the voltage of Aluminum battery 1 is 1.5 V. After the charging device 400 charges Aluminum battery 1 by using the constant current with 1 C, the charging device 400 charges Aluminum battery 1 by using the constant voltage with 120 minutes. After the first experiment, the second experiment is carried out by first discharging the aluminum battery 1 until the voltage of the aluminum battery 1 was decreased to 1.5V. The rest of the experiment can be done in the same manner.

According to some embodiments of the present disclosure, Table 2 below shows an experiment result in accordance with some embodiments. Regarding the experiment, the aluminum battery charging device 400 charges the aluminum battery by using the constant current and the constant voltage, and the charge time of the constant voltage is various in each experiment. Please refer to FIG. 2 for illustrating Table 2 below.

In Table 2, the charge time of the constant voltage that is provided by the charging device 400 is different, such as 10 minutes, 30 minutes and 60 minutes. However, the values of the constant current provided by the charging device 400 are identical, and the values of the constant voltage provided by the charging device 400 are identical. The aluminum battery charging device 400 charges different aluminum batteries including Aluminum battery 1 and Aluminum battery 2. Each of the Aluminum batteries 1~2 contains a graphitic-powder electrode. After Aluminum battery 1 is charged by the constant current that is 10 C, the constant voltage is used to charge Aluminum battery 1. The charge time of the constant voltage is different in every experiment. Therefore, it is found that the longer the charge time of the constant voltage received by Aluminum battery 1, the higher the capacity of Aluminum battery 1. Processing the same experiments to Aluminum battery 2, it can be found that the longer the charge time of the constant voltage received by Aluminum battery 2, the higher the capacity of Aluminum battery 2. For the aluminum battery having a graphitic-powder electrode, the longer the charge time of the constant-voltage charging, the higher the increment of the capacity of the aluminum battery. As a result, compare to the constant current, the constant voltage charging can be more significant to increase the capacity of the aluminum battery. In this embodiment, the charging device 400 only needs to provide constant-voltage charging for 10 minutes and constant-current charging that is 10 C, thereby significantly increasing the capacitance of the aluminum battery.

Figure 5A:
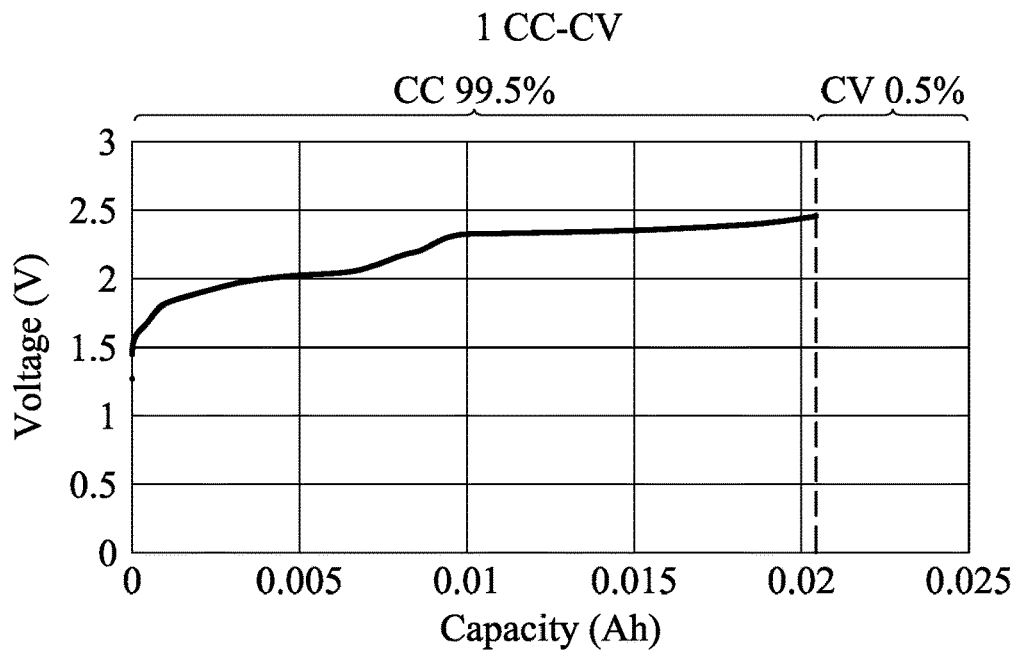
FIG. 5a is a capacity ratio chart of the aluminum battery, in accordance with the low current charging device charging the aluminum battery.
Figure 5B:
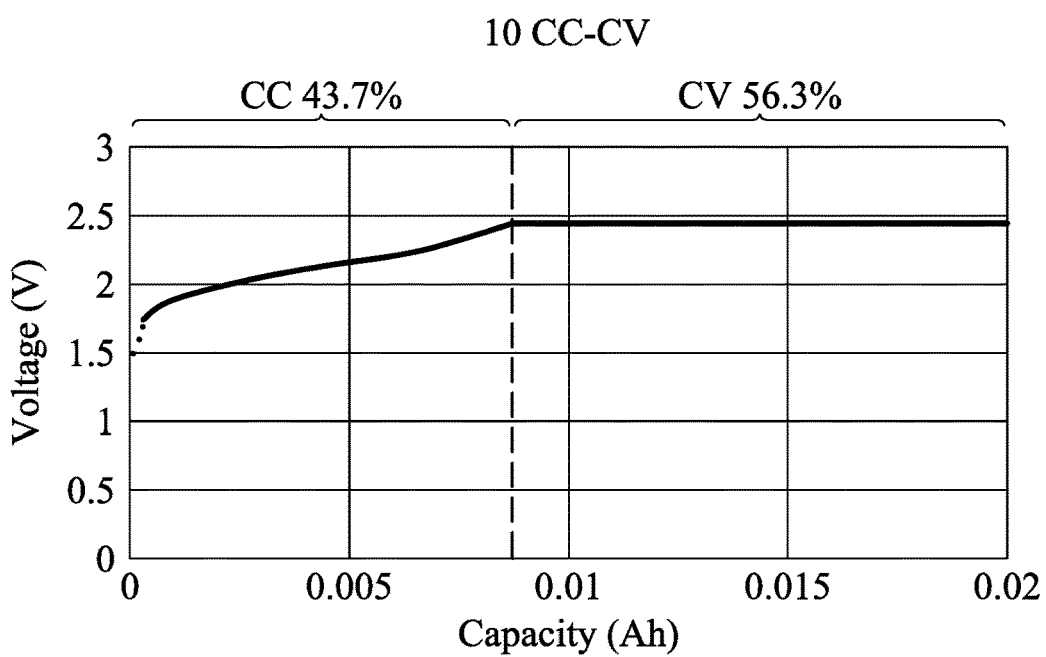
FIG. 5b is a capacity ratio chart of the aluminum battery, in accordance with the charging device charging the aluminum battery in one embodiment of the present disclosure.

FIG. 5a is a capacity ratio chart of the aluminum battery, in accordance with the low current charging device charging the aluminum battery. FIG. 5b is a capacity ratio chart of the aluminum battery, in accordance with the charging device charging the aluminum battery in one embodiment of the present disclosure. Please refer to FIG. 5a and FIG. 5b. It can be seen from the ratio of constant current-constant voltage (CC-CV) to capacity in FIG. 5a. The charging device 400 provides a low constant current which is 1 C to the aluminum battery, and the ratio of capacity charged by the low constant current is 99.5% of the whole capacity. Then, the voltage of the aluminum battery can be charged to the target voltage, and the constant voltage only contributes 0.5% of the whole capacity. In FIG. 5b, the charging device of the one embodiment in the present disclosure provides a constant current which is 10 C to the aluminum battery, and the ratio of capacity charged by the constant current is only 43.7% of the whole capacity. Then, the voltage of the aluminum battery can be charged to the target voltage, and the constant voltage can contribute 56.3% of the whole capacity. As a result, compare to 1 C CC-CV, 10 C CC-CV can significantly increase the capacity of charging and discharging and shorten the charge time.

The present disclosure uses constant current and constant voltage (CC-CV) to charge the aluminum battery and other secondary battery, and the values of the constant current are different. The experiment results are organized as Table 3:

TABLE 2

|  | Charging method | Capacity (mAh/g) |
|---|---|---|
| Aluminum battery 1 | 10 C + 10 mCV | 90.1 |
|  | 10 C + 30 mCV | 110.5 |
|  | 10 C + 60 mCV | 134.6 |
| Aluminum battery 2 | 10 C + 10 mCV | 69.5 |
|  | 10 C + 30 mCV | 75.4 |
|  | 10 C + 60 mCV | 81.5 |

TABLE 3

|  | CC-CV | Charge time | Capacity (mAh/g) |
|---|---|---|---|
| Secondary Battery | CC(0.2 C~1 C) | 20% | 80% |
|  | CV | 80% | 20% |
| Aluminum Battery | CC(10 C) | 16.5% | 43.7% |
|  | CV(10 minutes) | 83.5% | 56.3% |

As shown in Table 3, when the secondary battery is charged by the constant current (CC) which is 0.2 C~1 C and the constant voltage (CV), the charge time of the constant current (CC) accounts for 20% of the whole charge time, and the capacity accounts for 80% of the whole capacity of the secondary battery. However, according to the experiment results in Table 1, there is a limitation for using constant current (CC) to increase the capacity of the secondary battery. As a result, although matching constant voltage (CV) to charge aluminum battery, the capacity of the aluminum battery is only increased to 20%. Under this condition, if the charge time of the constant voltage (CV) is increased, it can possibly increase the capacity of the secondary battery. However, it would spend too much time and make the overall charge time becomes much longer. On the contrary, if the aluminum battery is charged by the constant current (CC) which is 10 C and the constant voltage (CV) for 10 minutes, the charge time of the constant current (CC) accounts for only 16.5% of the whole charge time, and the capacity accounts for 43.7% of the capacity of the aluminum battery. The constant voltage (CV) for 10 minutes accounts for 83.5% of the whole charge time, and the capacity accounts for 56.3% of the capacity of the aluminum battery. It can significantly increase the capacity of the aluminum battery.

According to the description above, the present disclosure uses constant current and constant voltage (CC-CV) to charge the aluminum battery, and the values of the constant current (CC) are different, and the charge time of the constant voltage (CV) is different. The experiment results are shown as Table 4:

TABLE 4

| | Charging Capacity (mAh/g) | Discharging Capacity (mAh/g) | Charge time (min:sec) | Discharge time (min:sec) |
|---|---|---|---|---|
| 1C1D | 72 (1 C) | 70 (1 D) | 43:08 | 42:07 |
| 1C10D | 74 (1 C) | 54 (10 C) | 44:50 | 03:18 |
| 10 C-CV 1 min | 31 (10 C) | 31 (10 C) | 02:14 | 01:51 |
| 10 C-CV 3 min | 44 (10 C) | 43 (10 C) | 04:21 | 02:35 |
| 10 C-CV 5 min | 53 (10 C) | 53 (10 C) | 06:35 | 03:09 |
| 10 C-CV 7 min | 60 (10 C) | 58 (10 C) | 08:41 | 03:30 |
| 10 C-CV 10 min | 63 (10 C) | 62 (10 C) | 11:39 | 03:42 |

As shown in Table 4, if the aluminum battery is charged by the constant current (CC) which is 1 C, it would take at least 48 minutes and 8 seconds. The charging capacity is 72 mAh/g, and the discharging capacity is 70 mAh/g. If the aluminum battery is charged by the constant current (CC) which is 1 C and it also takes at least 44 minutes and 50 seconds, the charging capacity is 74 mAh/g, and the discharging capacity is 54 mAh/g. In other words, when the aluminum battery is charged by the constant current (CC) which is 10 C and the constant voltage (CV) for 10 minutes, the charge time is only 11 minutes and 39 seconds. The charging capacity is 63 mAh/g, and the discharging capacity is 62 mAh/g. As a result, charging an aluminum battery with a constant current which is a large current and a constant voltage can not only greatly shorten the charge time, but also increase the capacity of the aluminum battery. In some embodiment, during the constant-current charging (such as the period of the first constant-current charging) and the constant-voltage charging (such as the period of the first constant-voltage charging), the ratio of the charge time is about 1:4~1:10. During the constant-current charging and the constant-voltage charging (such as during the first constant-current charging and the first constant-voltage charging), the ratio of the capacity of the aluminum battery in the constant-current charging to the capacity of the aluminum battery in the constant-voltage charging is about 1:0.5~1:3.

In the present embodiment, each time of the experiment is operated when the aluminum battery is at the lowest voltage. For example, when the experiment is processed at the first time, the voltage of Aluminum battery 1 is 1.5 V. After the charging device 400 charges Aluminum battery 1 by using the constant current which is 10 C, the charging device 400 charges Aluminum battery 1 by using the constant voltage for 10 minutes. After the first experiment, the second experiment was carried out by first discharging the aluminum battery 1 until the voltage of the aluminum battery 1 was decreased to 1.5V. The rest of the experiment can be done in the same manner.

Specifically, in the present disclosure, the aluminum battery mentioned in each embodiment contains a graphitic-powder electrode, but it is used for an example to illustrate the present disclosure. The present disclosure is not limited to this.

In summary, in the present disclosure, charging the aluminum battery 300 with the first constant current can greatly reduce the charge time, and charging the aluminum battery with the first constant voltage can increase the capacitance of the aluminum battery. Therefore, applying the first constant current and the first constant voltage to the charging method of the aluminum battery can greatly reduce the charge time and increase the capacity of the aluminum battery. Comparing with the conventional battery charging method and charging device for charging other secondary batteries, the present disclosure can better meet the needs of the market in the future.

While the disclosure has been described above in terms of a preferred embodiment, it is not intended to limit the scope of the disclosure, and it should be understood by those of ordinary skill in the art without departing from the spirit and scope of the disclosure. Instead, the scope of the disclosure should be determined by the scope of the appended claims.

The terminology used herein is for the purpose of describing particular embodiments only and is not intended to limit the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

What is claimed is:
1. An aluminum battery charging method, comprising:
performing a first charging procedure on the aluminum battery until a voltage of the aluminum battery reaches a set value;
wherein the first charging procedure at least comprises operating a first constant-current charging in a first stage on the aluminum battery by using a first constant current, and the first constant current is 5 C~100 C, wherein C(C-rate) represents a unit of a capacity of the aluminum battery;
wherein when the voltage of the aluminum battery reaches the set value, performs a first constant-voltage charging on the aluminum battery by using a first constant voltage; and
according to a charging current or a charge time which are caused by the first constant voltage charging the aluminum battery, determines to stop charging the aluminum battery, wherein a charging-time ratio of a charge time of the first constant-current charging to a charge time of the first constant-voltage charging is 1:4~1:10; wherein during the charge time of the first constant-current charging and the charge time of the first constant-voltage charging, a capacity ratio of the aluminum battery is 1:0.5~1:3.

2. The aluminum battery charging method of claim 1, wherein a charge time of the first stage is equal to a charge time that represents how much time the aluminum battery takes to reach the set value, and the first charging procedure only uses the first constant current to charge the aluminum battery.

3. The aluminum battery charging method of claim 1, wherein the first charging procedure operates a second constant-current charging or a second constant-voltage charging in a second stage to the aluminum battery by using a second constant current or a second constant voltage, and the first charging procedure operates a third constant-current charging in a third stage on the aluminum battery by using a third constant current.

4. The aluminum battery charging method of claim 3, wherein when the first charging procedure operates the second stage by using the second constant current or the second voltage current, the second stage is operated between the first constant-current charging and the third constant-current charging, and the second constant current is not equal to the first constant current and the third constant current.

5. The aluminum battery charging method of claim 4, wherein the second constant current is lower than the first constant current and the third constant current.

6. The aluminum battery charging method of claim 4, wherein a charge time of the first stage and a charge time of the third stage are 6 seconds to 15 minutes, and a charge time of the second stage does not exceed 30 minutes.

7. The aluminum battery charging method of claim 1, wherein when the charging current caused by the first constant voltage charging the aluminum battery is reduced to reach a determined current, the aluminum battery charging method is disabled, or when an overall time of charging the aluminum battery reaches a preset time, the aluminum battery charging method is disabled.

8. The aluminum battery charging method of claim 1, wherein the aluminum battery has a graphitic-powder electrode.

9. An aluminum battery charging device, comprising:
a charger, coupled to the aluminum battery;
a controller, comprising a set value and comparing a voltage of the aluminum battery and the set value to control the charger to perform a first charging procedure;
wherein when the charger performs the first charging procedure, the charger at least operates a first constant-current charging in a first stage to charge the aluminum battery by using a first constant current, and the first constant current is 5 C~100 C, wherein C(C-rate) represents a unit of a capacity of the aluminum battery;
wherein when the controller detects that the voltage of the aluminum battery reaches the set value, the controller controls the charger to operate a first constant-voltage charging to the aluminum battery by using a first constant voltage; and the controller determines to stop the charger from charging the aluminum battery based on a charging current or a charge time which are caused by the first constant-voltage charging of the aluminum battery,
wherein a charging-time ratio of a charge time of the first constant-current charging to a charge time of the first constant-voltage charging is 1:4~1:10; wherein during the charge time of the first constant-current charging and the charge time of the first constant-voltage charging, a capacity ratio of the aluminum battery is 1:0.5~1:3.

10. The aluminum battery charging device of claim 9, wherein when the charger performs the first charging procedure, the controller controls the charger to selectively operate a second constant-current charging or a second constant-voltage charging in a second stage by using a second constant current or a second constant voltage, and the controller controls the charger to operate a third constant-current charging in a third stage by using a third constant current;
wherein when the charger operates the second constant-current charging or the second constant-voltage charging, the second constant-current charging or the second constant-voltage charging are operated between the first constant-current charging and the third constant-current charging, and the second constant current is different from the first constant current and the third constant current.

11. The aluminum battery charging device of claim 9, wherein a charge time for the first stage is equal to a charge time that the aluminum battery takes to reach the set value, and the charger only uses the first constant current to charge the aluminum battery.

* * * * *